United States Patent
Rooke et al.

(10) Patent No.: US 7,949,719 B2
(45) Date of Patent: *May 24, 2011

(54) MULTIMEDIA MESSAGE TRANSFER

(75) Inventors: Michael Rooke, Hyvinkaa (FI); George Denissoff, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/751,369

(22) Filed: Mar. 31, 2010

(65) Prior Publication Data

US 2010/0191817 A1  Jul. 29, 2010

Related U.S. Application Data

(63) Continuation of application No. 10/931,110, filed on Sep. 1, 2004, now Pat. No. 7,720,912.

(30) Foreign Application Priority Data

Feb. 9, 2004  (GB) .................................. 0402774.4

(51) Int. Cl.
- *G06F 15/16* (2006.01)
- *H04L 12/54* (2006.01)
- *H04M 1/64* (2006.01)
- *H04M 11/00* (2006.01)
- *H04W 4/00* (2009.01)

(52) U.S. Cl. ..................... 709/206; 370/428; 379/88.12; 379/88.13; 455/466

(58) Field of Classification Search .................. 709/206; 370/428; 379/88.12, 88.13; 455/466

See application file for complete search history.

(56) References Cited

U.S. PATENT DOCUMENTS

| | | | |
|---|---|---|---|
| 7,430,284 | B2 | 9/2008 | Dudley et al. |
| 7,590,066 | B2 | 9/2009 | Laumen et al. |
| 7,720,912 | B2 * | 5/2010 | Rooke et al. .................. 709/206 |
| 2003/0073450 | A1 | 4/2003 | Laumen et al. |
| 2003/0119552 | A1 | 6/2003 | Laumen et al. |
| 2003/0193951 | A1 | 10/2003 | Fenton et al. |
| 2003/0193967 | A1 | 10/2003 | Fenton et al. |
| 2003/0235278 | A1 | 12/2003 | Paila |
| 2005/0220064 | A1 | 10/2005 | Hundscheidt et al. |

(Continued)

FOREIGN PATENT DOCUMENTS

JP  07-177171 A  7/1995

(Continued)

OTHER PUBLICATIONS

3GPP TS 32.235 v 4.6.0, "3rd Generation Partnership Project; Technical Specification Group; Telecommunication Management; Charging Management; Charging Data Description for Application Services (Release 4)", www.arib.or.jp/IMT-2000/V440Mar05/5_Appendix/Re14/32/32235-460.pdf Jun. 2003, pp. 1-41.

(Continued)

*Primary Examiner* — George C Neurauter, Jr.
(74) *Attorney, Agent, or Firm* — Squire, Sanders & Dempsey (US) LLP

(57) ABSTRACT

A method for multi-media message transfer transmits a message to multiple recipients. The method includes receiving a message addressed to multiple recipients. The method also includes determining an indication of a state of each recipient. The method also includes transmitting an acknowledgement. The acknowledgment includes at least one message identifying at least one recipient and the associated state of the at least one recipient.

21 Claims, 3 Drawing Sheets

U.S. PATENT DOCUMENTS

| | | |
|---|---|---|
| 2005/0259652 A1 | 11/2005 | Tang et al. |
| 2007/0058616 A1 | 3/2007 | Li |
| 2007/0088848 A1 | 4/2007 | Chen et al. |
| 2008/0194277 A1 | 8/2008 | Bai et al. |

FOREIGN PATENT DOCUMENTS

| | | |
|---|---|---|
| KR | 20010085329 | 9/2001 |
| RU | 2144274 C1 | 1/2000 |
| RU | 2159955 C1 | 11/2000 |
| WO | 0243414 A2 | 5/2002 |
| WO | 03094534 A2 | 11/2003 |

OTHER PUBLICATIONS

T2-040258 3GPP, "Change Request on MMS", www.3gpp.org/ftp/tsg_t/TSGT_24/Docs/PDF/TP-040095.pdf Jun. 2-4, 2004.

K. Moore, et al., "An Extensible Message Format for Delivery Status Notifications", Network Working Group, The Internet Society, 2003.

3rd Generation Partnership Project 2 (3GPP2), "MMS MM4 Stage 3 Intercarrier Internetworking", 3GPP2 X. S0016-340, Version 1.0.0, Apr. 3, 2003, 23 pages.

Translation of Office Action cited in corresponding JP Patent Application No. 2006-551951, issued Sep. 15, 2010.

* cited by examiner

MULTIMEDIA MESSAGE TRANSFER

CROSS-REFERENCE TO RELATED APPLICATIONS

This is a continuation application of U.S. patent application Ser. No. 10/931,110, filed on Sep. 1, 2004, which claims the benefit of 35 U.S.C. §119 of GB Application Number 0402774.4, filed on Feb. 9, 2004. The disclosures of the prior applications are hereby incorporated by reference in their entirety.

FIELD OF THE INVENTION

The invention relates to message transfer transmissions to a plurality of recipients, and particularly but not exclusively to multimedia message transfer between multimedia messaging service relays/servers in different multimedia messaging service environments.

BACKGROUND TO THE INVENTION

In 3GPP TS23.140 version 6.1.0 (or later), the MM4 interface and protocol set supports the sending of messages that have multiple recipients from a multimedia messaging service (MMS) relay/server in one multimedia messaging service environment (MMSE) to another MMS relay/server in a different MMSE.

In 3GPP TS23.140 version 6.1.0 there is defined a multimedia service (MMS) reference architecture, identifying reference points within a multimedia service network architecture (MMSNA). The reference points represent interfaces in the MMS reference architecture. Eight reference points are defined, and labelled MM1 to MM8. The reference points represent the interfaces, respectively, between an MMS user agent and an MMS relay/server; between an MMS relay and an MMS server; between an MMS relay/server and an external (legacy) messaging system; between an MMS relay server and another MMS relay server within another MMSE; between an MMS relay/server and a home location register; between an MMS relay/server and an MMS user database; between an MMS relay/server and an MMS VAS (value added service) application; and between an MMS relay/server and a billing system.

The reference point between the MMS relay/server and another MMS relay/server that is within another MMSE is labelled MM4.

3GPP TS23.140 version 6.1.0 defines the MM4 interface and a protocol set for supporting the sending of messages between an MMS relay/server in a first MMSE and an MMS relay/server in a second MMSE. The interface and protocol allows the sending of messages between the respective MMS relay/servers that have multiple recipients. Before 3GPP TS23.140 version 6.1.0 it was possible to send messages with multiple recipients in the interface provided by the MM1 reference point, which is the low bandwidth air interface. However in the core network, where the capacity has not usually been a problem, messages have been transferred individually to each recipient.

In 3GPP TS23.140 version 6.1.0 messages are sent to multiple recipients in a MM4_forward.REQ protocol data unit (pdu) message from an originator MMS relay/server to a recipient MMS relay/server. This message carries a "message ID" information element, which uniquely identifies the message and which is applicable to all recipients. The message includes MMS control information and the multimedia content.

The originator MMS relay/server can optionally request the recipient MMS relay/server to acknowledge the message transfer in the MM4 interface. Then the recipient MMS relay/server responds with a MM4_forward.RES pdu message, which provides the status of the request. However if multiple recipients are addressed in the request message, the recipient MMS relay/server can only respond with a limited response message. The response messages contain only the message ID, which is unique to the message but not to any intended recipient. No indication of a recipient causing a partial addressing failure is contained in the response message.

It is an aim of the invention to provide an improved messaging interface. In particular, it is an aim of embodiments of the invention to provide an improved MMS messaging interface between different MMS environments.

SUMMARY OF THE INVENTION

In one aspect of the invention there is provided a method of transmitting a message to multiple recipients comprising: receiving a message addressed to multiple recipients; determining an indication of a state of each recipient; and transmitting an acknowledgement, the acknowledgment including at least one message identifying at least one recipient and the associated state of said at least one recipient.

The state of each recipient may indicate a transmission status of the message to that recipient. The step of receiving a message addressed to multiple recipients may include receiving a request to transmit the message to multiple recipients. The request to transmit the message to multiple recipients may be inherent in the receipt of a message addressed to multiple recipients. The request to transmit the message to multiple recipients may be embedded in the receipt of a message addressed to multiple recipients.

The acknowledgement may include a plurality of messages each identifying at least one recipient, and each including one of a corresponding plurality of states. The acknowledgement may include at least one message identifying a plurality of sets of recipients and a corresponding plurality of states, each state being associated with a set of recipients. Each set may contain one or more recipients.

The state may indicate one of: an invalid recipient address; an incomplete transmission; or a successful transmission. The status may indicate that the state is unknown.

The method may further comprise the step of, responsive to receipt of an acknowledgement message indicating an incomplete transmission, retransmitting the message to the at least one recipient identified in said acknowledgement message.

The at least one message identifying at least one recipient and a state of the transmission to said at least one recipient may identify a plurality of recipients, said state being common to all of said identified recipients.

The method may further comprise the step of receiving a request to transmit the message from a message originator, and transmitting the acknowledgement to the message originator.

The message originator may have a mailbox and the acknowledgement is transmitted to the mailbox. The acknowledgement may provide the message originator with a delivery status for each recipient.

At least one message may be transmitted using session initiation protocol. The message may be a multi-media service message.

In a further aspect the invention provides a method of transmitting a multi-media message to multiple recipients comprising: receiving at an originating multi-media service element a request to transmit the message to multiple recipients in a different multi-media service environment; transmitting the multi-media message from the originating multi-media service element to a recipient multi-media service element of the different multi-media service environment, including an identity of the recipients; determining the status of each recipient at the recipient multi-media service element; and transmitting an acknowledgement from the recipient multi-media service element to the originating multi-media service element, the acknowledgment including at least one message identifying at least one recipient and a status of said recipient.

The multiple recipients of the different multi-media service environment may be subscribers of the different multi-media service environment.

The request to transmit the message to multiple recipients in a different multi-media service environment may further include a request to transmit the message to one or more recipients in the originating multi-media service environment. The request to transmit the message to multiple recipients in a different multi-media service environment may further include a request to transmit the message to one or more recipients in a still further different multi-media service environment.

Responsive to an acknowledgement message indicating an incomplete transmission status, the method may include retransmitting the multi-media message from the originating multi-media service element to a recipient multi-media service element of the different multi-media service environment, the retransmitted message identifying the recipients associated with the incomplete transmission status.

In a further aspect the invention may provide a MM4_forward.RES protocol data unit message format in accordance with 3GPP TS23.140, including an information element identifying at least one recipient, the status in said message applying to said at least one recipient. The information element may identify a plurality of recipients, the status in said message applying to the plurality of recipients.

In a still further aspect the invention provides a network element including means for receiving a message addressed to multiple recipients; means for determining an indication of a state of each recipient; and means for transmitting an acknowledgement, the acknowledgment including at least one message identifying at least one recipient and the associated state of said at least one recipient.

The means for transmitting an acknowledgement may be adapted to transmit a plurality of messages identifying at least one recipient, each of said plurality of messages including one of a corresponding plurality of states.

In yet a further aspect the invention provides a network element including means for receiving a message addressed to multiple recipients; means for forwarding such message with an identity of said multiple recipients; and means for receiving an acknowledgement message including at least one message identifying at least one recipient and the associated state of said at least one recipient.

The network element may further include means for re-forwarding such message identifying those recipients associated with a state corresponding to a transmission failure.

The invention still further provides, in a multi-media messaging system, an originating multi-media service element having means for receiving a request to transmit a message to multiple recipients in a different multi-media service environment; and means for transmitting the multi-media message from the originating multi-media service element to a recipient multi-media service element of the different multi-media service environment; and the recipient multimedia service element including means for determining the status of each recipient; and means for transmitting an acknowledgement from the recipient multi-media service element to the originating multi-media service element, the acknowledgment including at least one message identifying at least one recipient and a status of said recipient.

The multimedia service elements may comprise multimedia service relays, servers, or relay/servers.

BRIEF DESCRIPTION OF THE FIGURES

The invention is described herein by way of example with reference to the accompanying drawings, in which.

DESCRIPTION OF THE PREFERRED EMBODIMENTS

The invention is described herein by way of reference to particular example applications. The invention however is not limited to such applications.

Figure 1:
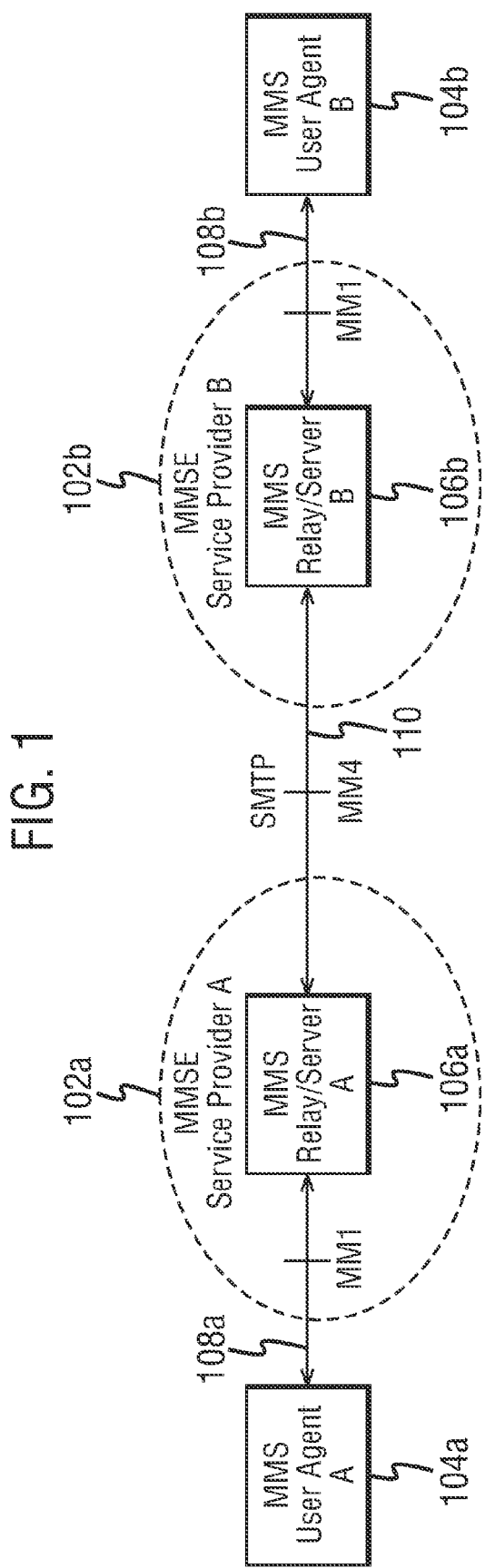
FIG. 1 illustrates the inter-working of different multimedia service environments.

In particular, the invention is described in an exemplary implementation of the exchange of multimedia service messages between different multimedia service environments. Reference is made to FIG. 1, in which there is illustrated an overview of the inter-working of two different multimedia service environments (MMSE), as defined by 3GPP TS23.140 version 6.4.0.

Referring to FIG. 1, a first multimedia service (MMS) user agent (UA) A, denoted by reference numeral 104a, is connected to a first MMS relay/server A, denoted by reference numeral 106a, of a first MMSE service provider A, denoted by reference numeral 102a. A second MMS user agent B, denoted by reference numeral 104b, is connected to a second MMS relay/server B, denoted by reference numeral 106b, of a second MMSE service provider B, denoted by reference numeral 102b. Each of the user agents 104a and 104b is connected to the respective MMS relay/server via an interface connection 108a and 108b respectively. The first and second MMS relay/servers 106a and 106b are interconnected via an interface 110.

Each of the MMS user agents 104a and 104b constitutes an application residing on a user equipment, a mobile station, or an external device that performs MMS-specific operations on a user's behalf. The MMS user agent is not considered part of an MMSE. Each of the MMS relay/servers 106a and 106b is an MMS-specific network entity/application or element that operates under the control of an MMS service provider. Each MMS relay/server transfers messages, provides operations of the MMS that are specific to or required by the mobile environment, and provides temporary and/or persistent storage services to the MMS.

The MMS reference architecture, as defined by 3GPP TS23.140 version 6.4.0, defines an MMS reference architecture and eight interfaces within the reference architecture denoted MM1 to MM8. FIG. 1 shows two of these reference points. The interfaces 108a and 108b between the MMS user agents and the MMS relay/servers represent the reference point MM1, being the reference point between the MMS user agent and the MMS relay/server. The reference point MM1 is used to submit multimedia messages from a MMS user agent to an MMS relay/server, to let the MMS user agent pull multimedia messages from the MMS relay/server, to let the MMS relay/server push information about multimedia messages to the MMS user agent as part of a multimedia message notification, and to exchange delivery ports between MMS relay/server and MMS user agents.

The interface 110 between the MMS relay/servers of the respective service environments represents the interface MM4, being the reference point between the MMS relay server and another MMS relay/server that is within another MMSE. The interface provided by reference point MM4 is used to transfer messages between the respective MMS relay/servers. The interworking between MMS relay/servers is based on the simple mail transfer protocol (SMTP).

Each MMS relay/server is adapted for peer discovery, to locate MMS relay/servers in other MMSEs. In a multimedia message transmission, an MMS relay/server which is transmitting a message is termed an originator, and an MMS relay/server which is receiving a message is termed a recipient or destination. After successful discovery of a peer entity, an originator MMS relay/server routes a multimedia request message to the recipient MMS relay/server. This request message contains MMS control information and the multimedia message content. The recipient MMS relay/server must respond with a response message if the originating MMS relay/server has an "acknowledgement request" information element field set in the MM4_forward.REQ message. The response message provides, for example, the status of the request. The request message is an MM4_forward.REQ message, and the response message is an MM4_forward.RES message. These messages are of protocol data units (PDUs) defined by 3GPP TS23.140.

The invention, in this embodiment, provides for an adaptation of the response message, as discussed further hereinbelow. No adaptation of the request message is necessary.

In accordance with this embodiment of the invention, an additional information element is included in the MM4_forward.RES message. This information element is termed "recipients". However the name of the information element is not limiting. The information element includes a list of recipients. If the MM4_forward.RES message contains a collective status indication in response to a MM4_forward.RES message, with multiple recipients, the list of recipients contained in the MM4_forward.RES message identifies the recipients to whom the collective status applies. A MM4_forward.RES message includes a request status value, and this request status value applies to all recipients identified in that message.

The information elements in the MM4_forward.RES protocol data unit message, adapted in accordance with this embodiment of the invention, is illustrated below in Table 1.

TABLE 1

| Information element | Presence | Description |
| --- | --- | --- |
| 3GPP MMS Version | Mandatory | The MMS version of the recipient MMS Relay/Server as defined by the present document. |
| Message Type | Mandatory | The type of message used on reference point MM4: "MM4_forward.RES". |
| Transaction ID | Mandatory | The identification of the MM4_forward.REQ/MM4_forward.RES pair. |
| Message ID | Mandatory | The Message ID of the MM which has been forwarded within the corresponding MM4_forward.REQ |
| Recipients | Conditional | List of recipients, If the MM4_forward.RES contains a collective status indication in response to a MM4_forward.RES with multiple recipients, |

TABLE 1-continued

| Information element | Presence | Description |
| --- | --- | --- |
| | | this list identifies the recipients to whom the Request Status value contained in this pdu applies. |
| Request Status | Mandatory | The status of the request to route forward the MM. |
| Request Status text | Optional | Status text corresponding to the Request Status |

All of the information elements shown in Table 1 are defined in 3GPP TS23.140 version 6.4.0, with the exception of the new information element in accordance with this embodiment of the invention, namely the "recipients" information element. The other information elements shown will be familiar to one skilled in the art, and the function of such information elements are described in the "description" column of Table 1. The "presence" column of Table 1 identifies whether the presence of such information element is optional, mandatory, or conditional.

As shown in Table 1 the presence of the "recipients" information element is conditional. For example, if the message was addressed to a single recipient, it is not essential to include the "recipients" information element in the response, since it is effectively redundant. Further, if the request status is the same for all recipients, the recipient information element is not necessarily needed in the response. However, in both cases the recipient information element may nevertheless be present.

The operation of an embodiment of the invention to secure the reliable transfer of multimedia services between multimedia service environments is now further described with reference to the message flow of FIG. 2 and the flow process of FIG. 3.

Figure 2:
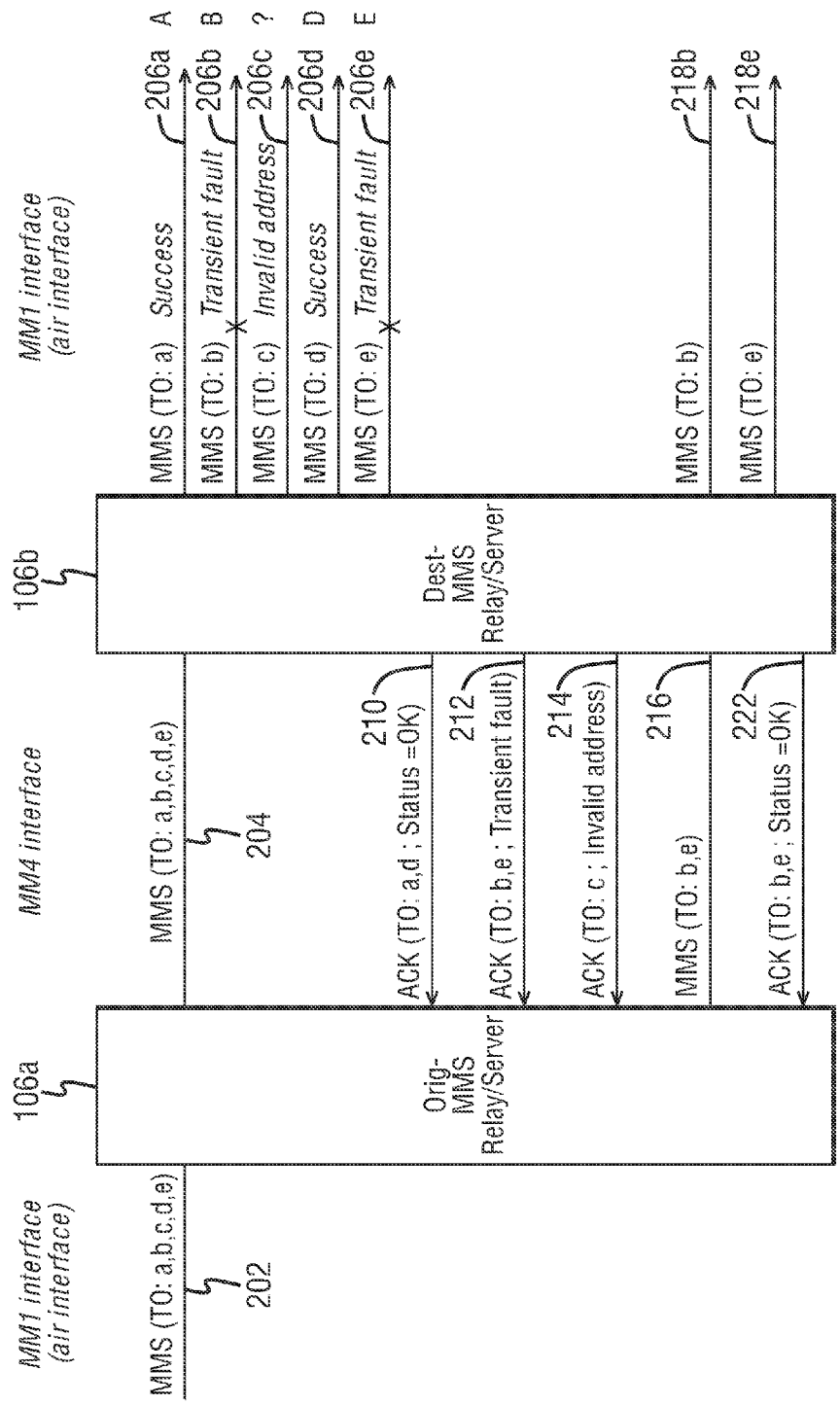
FIG. 2 illustrates a messaging flow in an embodiment of the invention applied to the environment of FIG. 1.

Referring to FIG. 2, an example is shown in which a multimedia message is transmitted by the MMS relay/server A 106a to the MMS relay/server B 106b. Thus the MMS relay/server A 106a is the originating multimedia messaging service controller (MMSC), and the MMS relay/server B 106b is the destination or recipient MMSC.

In a step 302, an MMS request is received on a line 202 at the originating MMS relay/server 106a. In the example, the MMS is to be sent to five recipients, labelled a, b, c, d, e. As known in the art, the originating MMS relay/server 106a carries out a discovery process to identify the appropriate peer MMS relay/server. In this way the destination or recipient MMS relay/server 106b is identified. In this example, all five recipients are located for simplicity within the same MMSE 102b, i.e. controlled by MMS relay/server 106b, however this may not necessarily be the case in practical implementations. The originating MMS relay/server 106a receives the MMS on the air interface, which is denoted by the reference point MM1 in the MMS reference architecture.

As denoted by step 304, the interface provided by the MM4 reference point, denoted by reference numeral 204, is then used by the originating MMS relay/server 106a to transmit an MMS request message (denoted as a MM4_forward.REQ pdu by 3GPP TS 23.140), including the identity of the five recipients, to the destination MMS relay/server 106b. According to 3GPP TS 23.140 version 6.1.0, the request for an acknowledgement is an optional feature. However, the invention described herein applies equally even if the provision of an acknowledgement is mandatory. As discussed hereinabove, the message sent on the MM4 interface 204 is an SMTP message, and is an MM4_forward.REQ pdu request message. The message further includes a unique identifier, which uniquely identifies the message.

As denoted by step 306, the recipient MMS relay/server 106b receives the MMS request message from the originating MMS relay/server 106a on the MM4 interface 204.

A recipient MMS relay/server, upon receiving a MMS request message, and specifically a MM4_forward.REQ pdu, has to determine the request status code for each recipient before attempting to forward the pdu to the recipients. This is known in the art, and is necessary because of latency involved in communicating with the recipients (e.g. the recipient may itself determine when it is willing to retrieve the pdu). It should be noted that the recipients are user agents.

In order to determine the request status code for each recipient, the recipient MMS relay/server additionally retrieves a user agent profile for each recipient. This is also denoted by step 306. The user agent profiles are retrieved from a database denoted as the reference point MM6 by 3GPP TS23.140 version 6.1.0.

In a step 308 the receiving MMS relay/server examines both the MM4_forward.REQ pdu it has received and a user agent profile it retrieves from the database. The user agent profile contains a description of the capabilities of the user agent and possibly other user agent-specific data, e.g. whether the user agent is barred. The receiving MMS relay/server then determines for each user agent (or recipient) whether the actual message (whish is of the format MM1_retrieve.RES generated from the MM4_forward.REQ) can be forwarded to the user agent in question. Following such determination, a status code is determined for each recipient as denoted by step 310.

The possible request status codes defined by 3GPP TS 23.140 version 6.4.0, and their meanings, are set out in Table 2 below.

TABLE 2

| X-Mms-Request-Status-Code | Meaning |
| --- | --- |
| Ok | The corresponding request and some or all of its contents were accepted without errors. |
| Error-unspecified | An unspecified error occurred during the processing or reception of the corresponding request. |
| Error-service-denied | The corresponding request was rejected due to failure of authentication or authorisation of the originating MMS Relay/Server. |
| Error-message-format-corrupt | An inconsistency with the message format was detected when the corresponding request was parsed. |
| Error-sending-address-unresolved | There were no MMS address (From:, To:, Cc:, Bcc:) in its proper format or none of the addresses belong to the recipient MMS Relay/Server. |
| Error-message-not-found | This status code is obsolete |
| Error-network-problem | The recipient MMS Relay/Server was not able to accept the corresponding request due to capacity overload. |
| Error-content-not-accepted | The MM content was not accepted due to size, media type, copyrights or some other reason. |
| Error-unsupported-message | The recipient MMS Relay/Server does not support the corresponding request abstract message. |

Not all of the status codes are possible as a result of the examination of step 308. Those status codes that may possibly be determined for each recipient in accordance with embodiments of the invention are discussed further hereafter.

The "Ok" status code indicates that the message can be delivered to the recipient 'as is', or after content adaptation performed by the recipient MMS relay/server The "Error-sending-address-unresolved" status code indicates that the particular recipient (user agent) is not a subscriber of the recipient MMS relay/server The "Error-content-not-accepted" status code indicates that the particular recipient (user agent) is unable to accept the content of the message.

The "Error-network-problem" status code indicates that the recipient MMS relay/server is not able to accept the corresponding request due to a capacity overload. This status could conceivably be given on a per recipient (user agent) basis from the MMS relay/servers that may set a limit on the maximum number of recipients allowed for a single message. This status could also conceivably occur if some of the recipients are actually applications (instead of handsets) that are temporarily overloaded or unavailable.

The other codes listed in Table 2 and not mentioned hereinabove apply to the MM4_forward.REQ pdu as an entity, and not to the individual recipients (user agents), and thus are not relevant to the embodiments of the invention. However new status codes may be introduced in revised versions of 3GPP TS 23.140 and some of them may be recipient specific.

After the status determination step, in a step 312 the message may be forwarded by the recipient MMS relay/server to those recipients to which transmission is possible in accordance with standardised techniques.

The destination or recipient MMS relay/server 106b processes the transmission of the MMS message to each of the recipients a, b, c, d, e individually. This is represented graphically in FIG. 2. by the respective signals 206a to 206e. These signals 206a to 206e illustrate processing of the MMSs individually in the recipient MMS relay/server 106b. However, as shown in FIG. 2 the messages are not necessarily successfully delivered to all recipients.

It should be noted that the transmission of these messages to the individual recipients in accordance with a determined status is known in the art. The invention does not propose any adaptation to the messages transmitted on the interface provided by the MM1 reference point. It is envisaged, however, that the invention will support any modifications to the interface provided by the MM1 reference point, and the creation of any new messages in the future.

Figure 3:
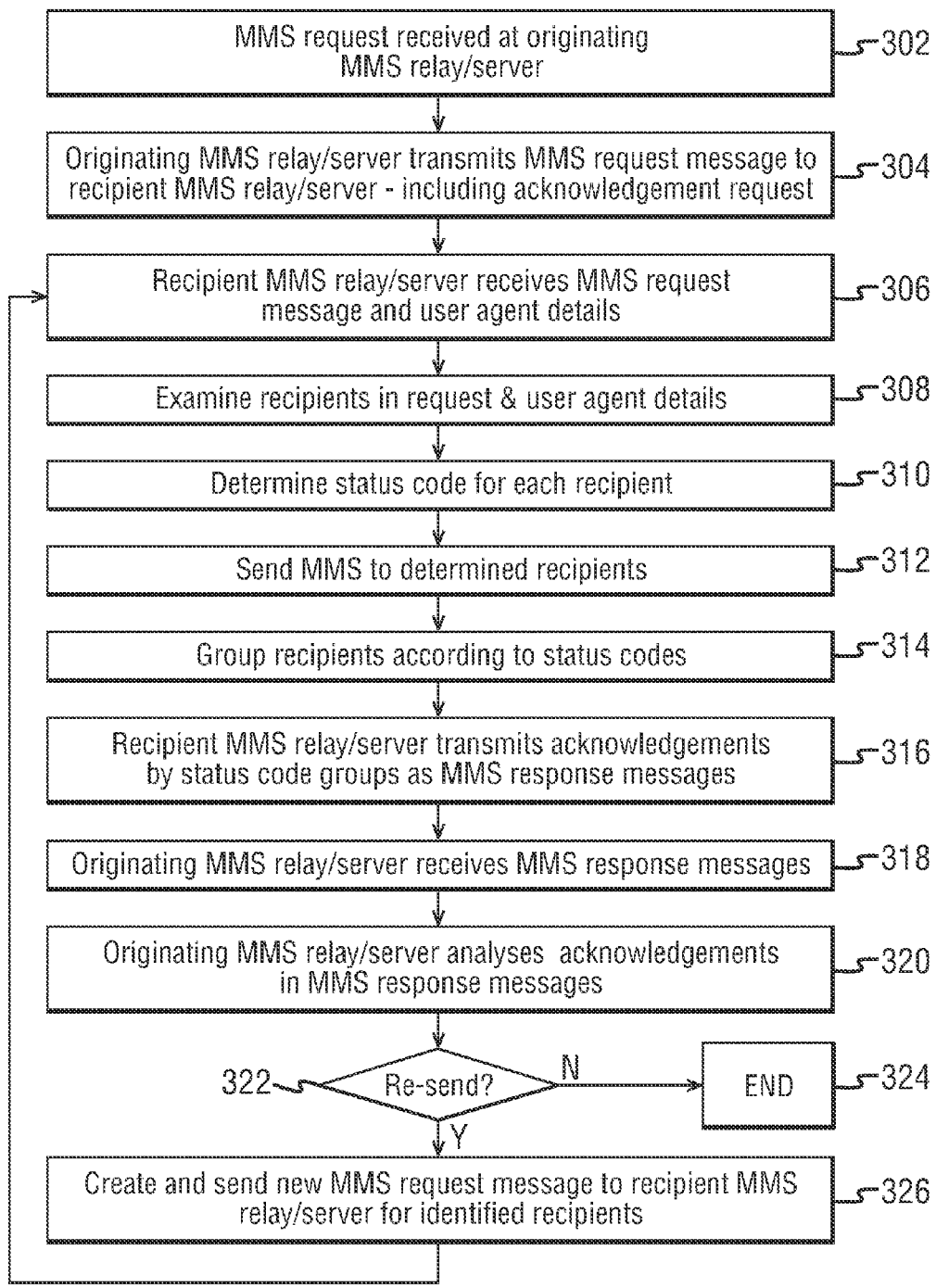
FIG. 3 illustrates the method steps associated with the message flow of FIG. 2.

It should be noted that step 312 may occur to transmit the messages any time after the status of the recipients are determined, and the order of occurrence of step 312 in FIG. 3 need not be adhered to.

After the determination of the status code for each recipient in step 310, in step 314 the recipient MMS relay/server groups the recipients in accordance with shared status codes Thus the destination or recipient MMS relay/server 106b collates the status codes for the various recipients. The recipients are then all grouped according to particular categories. Thus, for example, each recipient which has an "Ok" status code is grouped together etc.

Thereafter, as represented by step 316, the destination or recipient MMS relay/server 106b transmits multiple acknowledgement messages back to the originating MMS relay/server, the number of acknowledgement messages corresponding to the number of types of status code identified as being associated with the individual recipients. Thus if all recipients have an "Ok" status code, for example, a single acknowledgement may be transmitted back to the originating MMS relay/server 106a.

In the example described, a first acknowledgement message is transmitted back as signal 210, identifying the recipients a and d, and indicating the status to be "ok". A second acknowledgement message is transmitted back, as signal 212, identifying the recipients b and e, and identifying the transmission status to be a transient fault. A third acknowledgement message is transmitted as signal 214, identifying recipient c, and indicating that an invalid address was provided. Each of the acknowledgement messages is transmitted as an MM4_forward.RES pdu message on the interface provided by the MM4 reference point.

The receipt of these messages by the originating MMS relay/server is denoted by step 318.

The originating MMS relay/server 106a, in step 320, then determines any further action to be taken responsive to the acknowledgement message(s) received from the recipient MMS relay/server. The originating MMS relay/server thus analyses these acknowledgment messages. For example, when an acknowledgement message indicates that transmission has failed due to a transient fault or error, the originating MMS relay/server 106a preferably resends the MMS to the destination MMS relay/server 106b, identifying the recipients associated with the transient fault.

Referring to Table 2 above, in the case of an "Error-sending-address-unresolved" status code, it is futile to attempt retransmission. In the case of an "Error-content-not-accepted" status code, the originating MMS relay/server may perform content adaptation to downgrade the pdu content to comply with the OMA Conformance Specification which defines the message contents that all user agents should support and then attempt retransmission. In the case of an "Error-network-problem" status code a retransmission may be attempted without pdu adaptation after a suitable interval (the interval being typically a configurable attribute of the originating MMS relay/server)

In the example shown in FIG. 2, a signal 216 is transmitted to the destination MMS relay/server 106b, identifying recipients b and e.

Referring to the flow chart of FIG. 3, after analysing the acknowledgements received from the recipient MMS relay/server, the originating MMS relay/server determines in a step 322 if any retransmission is appropriate. If not, the activity on the MM4 reference point interface ends in step 324. If retransmissions are appropriate, then in step 326 the originating MMS relay/server creates and sends a new MMS request message for the recipients associated with the retransmission to the recipient MMS relay/server. Steps 306 to 320 are then repeated.

The destination MMS relay/server 106b again processes the transmission of the message to each of the recipients b and e. This is represented graphically in FIG. 2 by the signals 218b and 218e.

On this occasion the destination MMS relay/server 106b determines an "Ok" status code for recipients b and e. This is denoted, graphically, by the transmission of signals 220b and 220e. A further acknowledgement message as denoted by signal 222 is returned to the originating MMS relay/server 106a which identifies recipients b and e and indicates the status to be "ok".

It should be noted that in an MMS system architecture there exists a known separate delivery report concept which is controlled by the originating MMS user agent. The originating MMS user agent can request in a MMS message a delivery report which is delivered to the MMS user agent after a successful delivery of the MMS. This MMS delivery report feature does not use the acknowledgement mechanism described above and is outside the scope of the invention. However, principles described above may be used in other communication systems to provide a message originator with a status indication (acknowledgement) of a message addressed to multiple recipients.

The MMS relay/server, when functioning as the originating MMS, requires some adaptation in order to deal with the re-transmission of messages for individual recipients. However retransmission of messages after a transient failure is a typical feature of MMS relay/servers. The only additional functionality needed to support the described invention is to determine which recipients of a MM4_forward.REQ pdu have a transient failure associated with them, and to retransmit only to this set of recipients.

The invention advantageously allows for the originating MMS relay/server to identify the specific recipients to which a message is delivered or not delivered. As the originating MMS controller is responsible for billing a user who sent a message, it is advantageous for the originating MMS controller to know the status of a transmitted message, and to have control in respect of making a decision as to whether messages should be resent to failed recipients.

The invention has been described in the context of an MMS environment. However the invention is not limited to such an environment, and may be more generally applicable. The invention applies to any architecture or network in which a message is sent addressed to a plurality of recipients, and in which an acknowledgement may be returned which identifies at least one of such recipients and a status associated with a delivery of the message to that recipient.

In the above-described MMS embodiment, a plurality of response messages may be sent to the originating MMS relay/server, corresponding to a plurality of status codes. However, alternative techniques for providing the status codes and associated recipients may be provided. For example, as an alternative solution to minimise the amount of message transferred between two MMS relay/servers one response message (e.g. MM4_forward.RES pdu message) may identify several status codes, and a separate recipient information element for every status indication. In a further alternative it may be possible to enumerate the status codes (errors) and recipients in the MM4_forward.RES message, so that the status of the same number in the list applies to the recipient with the same number in the corresponding list. However this approach is not ideal, as it may cause a backward compatibility problem. Further, it may be possible to provide two new headers (not using existing "request status" header): one for the list of recipients and the other for the list of status values.

In some communication systems the message delivery or the determination of whether message can be delivered to all recipients can take a relatively long time due to some reasons in the network or on recipients' side (e.g. network problems, terminal out of coverage, recipient's mailbox is full). In such case a partial response can be sent with the corresponding status indication to those recipients to whom the message delivery succeeded or an error occurred immediately. A final response for the rest of the recipients can be sent later when the final status of each individual delivery is known. Further, in some communication systems acknowledgement message(s) with status indications might be delivered, not only between core network elements, but also to the actual end user which originated the message to the multiple recipients. In particular, if the originating terminal is a mobile device, it is more efficient to transfer only one collective acknowledgement over the low bandwidth air interface. The acknowledgement message can be shown to a user as a normal received message or alternatively it can be used as a delivery report to provide a user with a status indication of the sent message by indicating the status of the delivery per each recipient or per several recipients.

A further example implementation of the technique of the present invention is in the context of session initiation protocol (SIP) messaging or instant messaging (IM). In SIP there exist an active work item at IETF (Internet Engineering Task Force, www.ietf.org) relating to so called SIP Exploder concept. An example of a SIP exploder message is a request sent from a single user to, for example, a server. The message is then transmitted on, immediately or at the given moment of time, from the server to a plurality of further users. In accordance with the principles of the invention as described hereinabove, each of the messages sent to the plurality of users may return an acknowledgement message to the server, and in this way the server may return to the originating user a status of the message transmission for each user or users. It is also possible to derive a status indication for a recipient from other signals or error messages received from the network. Further, in a case no response any kind is received from the network or from the user, the status of the delivery for that recipient can be set to unknown, e.g. after a certain time.

The invention has been described in the context of a particular, non-limiting example, as specifically in the context of an MMS environment and inter-MMS environment communication. It will be understood by one skilled in the art that the invention is not limited to such an environment, and may have more broadly applicable use. The scope of the invention is defined by the appended claims.

The invention claimed is:

1. A method, comprising:
receiving at a recipient relay/server a request addressed to multiple recipients, the request being from an originator relay/server;
determining at said recipient relay/server a status of the request for each recipient before attempting to deliver the request, the status of the request indicates whether the recipient address is valid; and
transmitting a response from said recipient relay/server identifying at least one recipient of the multiple recipients and the status of the request for said at least one recipient.

2. The method according to claim 1, wherein said determining the status of the request for each recipient comprises determining whether the request is transmittable to said each recipient.

3. The method according to claim 1, wherein said determining the status of the request for each recipient comprises examining user profile data of said multiple recipients.

4. The method according to claim 1, wherein the receiving of the request addressed to said multiple recipients comprises receiving a request to transmit the request to said multiple recipients.

5. The method according to claim 1, wherein said transmitting comprises transmitting the response, wherein the response comprises a plurality of messages, each message identifying said at least one recipient, and each message including one of a corresponding plurality of statuses.

6. The method according to claim 1, wherein said transmitting comprises transmitting the response, wherein the response comprises at least one message identifying a plurality of sets of recipients and a corresponding plurality of statuses of the request, each status associated with a set of said recipients.

7. The method according to claim 6, wherein each set of said plurality of sets comprises at least one recipient.

8. The method according to claim 1, wherein the status of the request comprises one of: content of the message not accepted; and a message accepted.

9. The method according to claim 1, wherein the response identifies a plurality of recipients and the status of the request is common for all of said identified plurality of recipients.

10. The method according to claim 1, further comprising transmitting the response to the originator relay/server.

11. The method according to claim 10, wherein a request originator has a mailbox and the response is transmitted to the mailbox.

12. The method according to claim 10, wherein said transmitting comprises transmitting the response, wherein the response identifies a plurality of recipients and the associated status for each of said plurality of the multiple recipients.

13. The method according to claim 1, further comprising using session initiation protocol for at least one of the request and said response.

14. The method according to claim 1, wherein said receiving comprises receiving the request, wherein the request comprises a multi-media service request.

15. An apparatus, comprising:
a receiver configured to receive a request addressed to multiple recipients, the request being from an originator relay/server;
a determining unit configured to determine a status of the request for each recipient before an attempt is made to deliver the request, the status of the request indicates whether the recipient address is valid; and
a transmitter configured to transmit a response, the response identifying at least one recipient and the status of the request for said at least one recipient.

16. The apparatus according to claim 15, wherein the transmitter is configured to transmit a plurality of responses identifying at least one recipient, each of said plurality of messages including one of a corresponding plurality of statuses.

17. A method according to claim 1, wherein the determining the status of the request for each recipient before attempting to deliver the request comprises determining an indication of the status of the request for each recipient before attempting to push information about the request to the respective recipient as part of a message notification.

18. The apparatus of claim 15, wherein said apparatus comprises a multimedia service relay, a server, and a relay/server.

19. An apparatus, comprising:
receiving means for receiving a request addressed to multiple recipients, the request being from an originator relay/server;
determining means for determining a status of the request for each recipient before an attempt is made to deliver the request, the status of the request indicates whether the recipient address is valid; and
transmitting means for transmitting a response, the response identifying at least one recipient and an associated status of the request for said at least one recipient.

20. A method as claimed in claim 1, wherein the request comprises an MM4_forward.REQ message.

21. A method as claimed in claim 1, wherein said response comprises an MM4_forward.RES message.

* * * * *